Nov. 9, 1937.   C. A. WATROUS   2,098,843
LIGHT SHIELD FOR CAMERAS, ETC
Filed Oct. 27, 1934   2 Sheets-Sheet 1
*Fig. 1.*
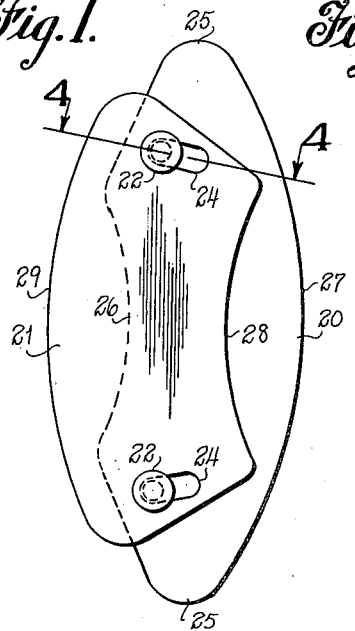
*Fig. 2.*
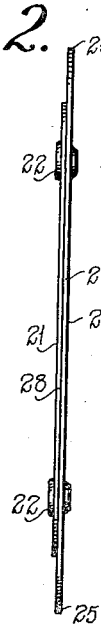
*Fig. 3.*
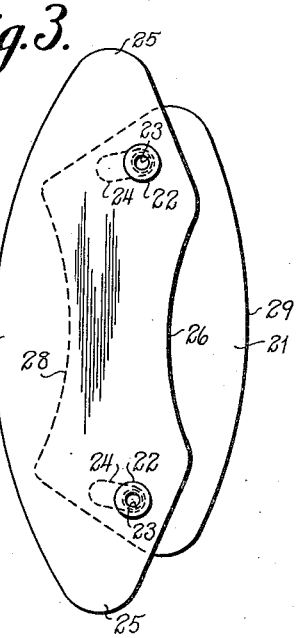
*Fig. 4.*
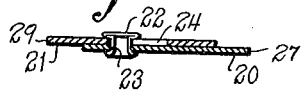
*Fig. 5.*   *Fig. 6.*
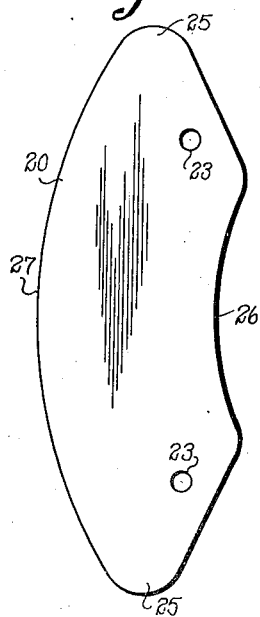 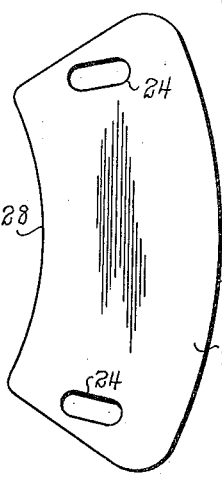
*Fig. 7.*
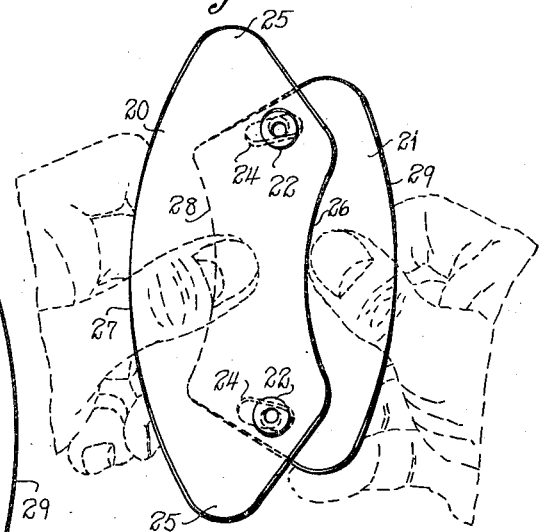
—INVENTOR—
Charles A. Watrous
—ATTORNEYS—
Seymour Earle & Nichols

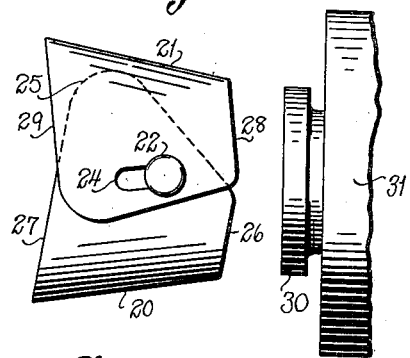
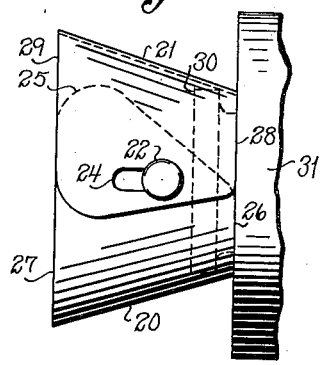
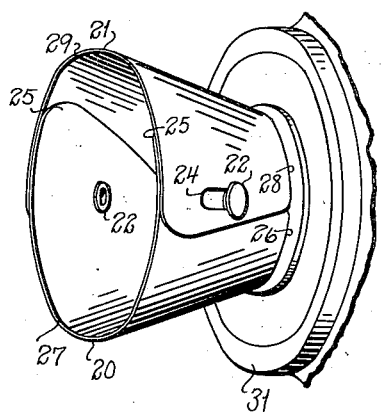
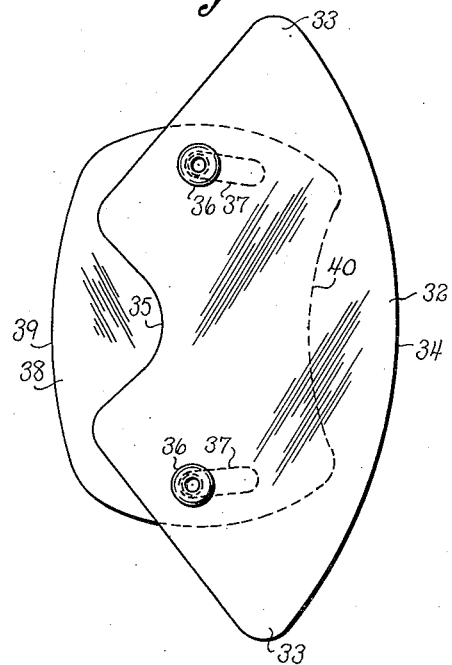

Patented Nov. 9, 1937

2,098,843

UNITED STATES PATENT OFFICE 2,098,843

LIGHT-SHIELD FOR CAMERAS, ETC.

Charles A. Watrous, New Haven, Conn.

Application October 27, 1934, Serial No. 750,306

6 Claims. (Cl. 88—1)

This invention relates to light-shields, and particularly to light-shields for cameras, though available for other uses, such, for instance, as upon telescopes, field glasses, etc.

One of the objects of the present invention is to provide at a low cost for manufacture a convenient and effective light-shield suitable for use in shielding the lens systems of cameras or other devices from undesirable lateral light rays.

A further object is to provide a simple and reliable light-shield of the general character referred to, which may be shipped or carried while substantially flat by a user, and conveniently converted into general tubular form by a simple manipulation.

With the foregoing and other objects in view, as will appear to those skilled in the art from the following, considered in conjunction with the accompanying drawings and appended claims, the present invention includes all features disclosed therein which are novel over the prior art.

In the accompanying drawings:

Fig. 1 is a view of one form which a light-shield embodying the present invention may assume, looking toward the outer face thereof;

Fig. 2 is an edge view thereof;

Fig. 3 is a view looking toward the inner face thereof;

Fig. 4 is a broken detail sectional view taken on the line 4—4 of Fig. 1;

Fig. 5 is an inner face view of one of the two leaves;

Fig. 6 is a similar view of the complementary slotted leaf;

Fig. 7 is a perspective view illustrating one mode of bowing the leaves into tubular form;

Fig. 8 is a side view of the shield after being bowed into substantially tubular form;

Fig. 9 is a similar view, showing the shield mounted upon the lens-head of a camera;

Fig. 10 is a perspective view of a portion of the camera, showing the lens-shield mounted thereon; and Fig. 11 is a face view of a slightly-modified form of shield.

The embodiment shown in Figs. 1 to 10 inclusive as illustrative of the present invention includes two complementary sheet- or leaf-like members 20 and 21, which, for convenience of description, may be respectively designated "major-leaf" and "minor-leaf". The complementary leaves 20 and 21 may be formed of any suitable sheet-material, such, for instance, as Celluloid, and are connected together at points adjacent their respective opposite ends by rivet-like members 22—22, preferably formed of light sheet-metal and of such construction and arrangement as to be substantially imperforate, to prevent the passage of light therethrough.

As shown, the major-leaf 20 is provided with two perforations 23—23, for the relatively-snug reception of the rivets 22—22, while the minor-leaf 21 is formed adjacent each of its respective opposite ends with slots 24—24, complementing the perforations 23—23 in the major-leaf 20 and through which the eyelets 22—22 extend with freedom for sliding movement therein. Preferably and as shown, the slots 24—24 in the minor-leaf 21 are inclined with respect to the transverse median line of the leaf for the purpose as will hereinafter appear.

As shown, the major-leaf 20 is slightly longer than the minor-leaf 21 and has at its respective opposite ends what, for convenience of description, may be aptly termed "terminal-ears" 25—25, and also has a concave inner edge 26 and a convex outer edge 27. Similarly, the minor-leaf 21 has a concave inner edge 28 and a convex outer edge 29, complementing the similar edges 26 and 27 of the major-leaf 20 when the shield is bowed into generally-tubular or frusto-conical form, as shown in Figs. 8, 9 and 10.

While the leaf 20 is preferably made longer than its complementary leaf 21, as shown, and the said leaves are referred to herein for convenience of description as "major" and "minor" leaves, respectively, the said leaves, if desired, may be of the same size and outline.

The shield, when its leaves are in the positions in which they are indicated in Figs. 1 to 3 inclusive, may be conveniently packed for shipment and display, and may be conveniently transported in a pocket of a user, and when it is desired to apply the shield to a camera-lens, for instance, the shield may be converted into generally-tubular form by grasping the same, as illustrated in Fig. 7, and applying pressure with the thumbs, as indicated in the said figure, to bring it to the form illustrated in Fig. 8.

After the shield is "formed-up," so to speak, as above described, the same may be slipped over the lens-head 30 of a camera 31 or the like, and when pressure is released, the inner surface of the shield adjacent the respective inner edges of the complementary leaves 20 and 21 will yieldingly grip the lens-head 30 and retain the shield in place thereon. When mounted, as shown in Fig. 9, the complementary convex outer edges 27 and 29 of the leaves 20 and 21 respectively form a substantially straight line, as do the complementary inner edges 26 and 28 of the said leaves. In this position, also, the slots 24—24 extend in a direction substantially parallel with the axis of the shield.

During the operation of converting or distorting the leaves from the flat position shown in Figs. 1 to 3 inclusive into the generally-tubular form shown in Figs. 7, 8 and 9, the slots 24—24 and the rivets 22—22 provide, in effect, a lost-motion pivotal connection which facilitates the converting action referred to.

Preferably, the surfaces of the leaf-members 20 and 21, which form the inner surfaces of the shield when converted into substantially-tubular form, are provided with a dull finish to avoid light refraction, and it will be observed that light is prevented from laterally entering the shield through the slots 24—24 in the leaf 21 by the overlapping portions of the complementary leaf 20.

When converted into substantially-tubular or frusto-conical form, as illustrated in Figs. 8, 9 and 10, the terminal-ears 25—25 of the major-leaf 20 overlaps a considerable distance upon the inner surface of the minor-leaf 21, as shown particularly well in Fig. 10, and in addition to assisting in maintaining the shield in a substantially-true circular cross-sectional form, they have the effect of tending to contract the inner end of the shield and thus cause the same to securely grip a lens-head or the like.

In Fig. 11 is shown a slightly modified form of shield, intended, when "formed up," to provide a shield of relatively-lesser diameter and greater depth than the shield illustrated in the preceding figures. This shield comprises a major-leaf 32 having terminal-ears 33—33, a convex outer edge 34 and a concave inner edge 35, and also having perforations adjacent its respective opposite ends through which rivets 36—36 extend. The rivets 36—36 just referred to extend through slots 37—37 formed in the complementary minor-leaf 38, which, in turn, is provided with a convex outer edge 39 and a concave inner edge 40.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A light-shield for installation upon the lens-mounts of cameras, comprising: two complementary flexible light-shield leaves of substantially-corresponding widths; and two pivots extending between the two said leaves respectively at spaced-apart points substantially equal to one-half the distance around the adjacent circumference of the cone to be formed; the said leaves and pivots being so constructed and arranged that the said leaves are super-imposable flatwise one upon the other when the light-shield is removed from a lens-mount and reversible from such condition into substantially-conical form for application to a lens-mount with their initially-opposite edges located at the same end of the cone.

2. A light-shield for installation upon the lens-mounts of cameras, comprising: two complementary flexible light-shield leaves of substantially-corresponding widths; and two lost-motion pivot-means pivotally connecting the two said light-shield leaves at spaced-apart points substantially equal to one-half the distance around the adjacent circumference of the cone to be formed; the said leaves and the said lost-motion pivot-means being so constructed and arranged that the said leaves are superimposable flatwise one upon the other when the light-shield is removed from a lens-mount and reversible from such condition into substantially-conical form for application to a lens-mount with their initially-opposite edges located at the same end of the cone.

3. A light-shield for installation upon the lens-mounts of cameras, comprising: two complementary flexible light-shield leaves of substantially-corresponding widths, and each having a concave edge and a convex edge; and two pivots extending between the two said leaves respectively at spaced-apart points substantially equal to one-half the distance around the adjacent circumference of the cone to be formed; the said leaves and the said pivots being so constructed and arranged that the said leaves are superimposable flatwise one upon the other with the convex edge of one leaf adjacent the concave edge of the other leaf when the light-shield is removed from a lens-mount, and reversible from such position into substantially-conical form for application to a lens-mount with the corresponding edges of each leaf located at the same end of the cone.

4. A light-shield for installation upon the lens-mounts of cameras, comprising: two complementary flexible light-shield leaves of substantially-corresponding widths, and each having a concave edge and a convex edge; and two lost-motion pivot-means pivotally connecting the two said leaves respectively at spaced-apart points substantially equal to one-half the distance around the adjacent circumference of the cone to be formed; the said light-shield leaves and the said lost-motion pivot-means being so constructed and arranged that the said leaves are superimposable flatwise one upon the other with the convex edge of one leaf adjacent the concave edge of the other leaf when the light-shield is removed from a lens-mount, and reversible from such position into substantially-conical form for application to a lens-mount with the corresponding edges of each leaf located at the same end of the cone.

5. A light-shield for installation upon the lens-mounts of cameras, comprising: two complementary flexible light-shield leaves of substantially-corresponding widths and one of the said leaves being longer than the other to provide a pair of terminal-ears; and two pivots extending between the two said leaves respectively at spaced-apart points substantially equal to one-half the distance around the adjacent circumference of the cone to be formed; the said leaves and the said pivots being so constructed and arranged that the said leaves are superimposable flatwise one upon the other when the light-shield is removed from a lens-mount and reversible from such condition into substantially-conical form for application to a lens-mount with their initially-opposite edges located at the same end of the cone and with the terminal-ears of the longer of the two said leaves engaged with the inner surface of the other of said leaves.

6. A light-shield for installation upon the lens-mounts of cameras, comprising: two complementary flexible light-shield leaves of substantially-corresponding widths and one of the said leaves being longer than the other to provide a pair of terminal-ears; and two lost-motion pivot-means extending between the two said leaves respectively at spaced-apart points substantially-equal to one-half the distance around the adjacent circumference of the cone to be formed; the said leaves and the said lost-motion pivot-means being so constructed and arranged that the said leaves are superimposable flatwise one upon the other when the light-shield is removed from a lens-mount and reversible from such condition into substantially-conical form for application to a lens-mount with their initially-opposite edges located at the same end of the cone and with the terminal-ears of the longer of the two said leaves engaged with the inner surface of the other of said leaves.

CHARLES A. WATROUS.